United States Patent
Ashmore et al.

(10) Patent No.: US 9,871,946 B2
(45) Date of Patent: Jan. 16, 2018

(54) ADAPTIVE FACSIMILE REDUNDANCY

(75) Inventors: Allan Ashmore, North Grafton, MA (US); Michael J. Rus, Newton, MA (US)

(73) Assignee: Dialogic Corporation, Montreal (CA)

( * ) Notice: Subject to any disclaimer, the term of this patent is extended or adjusted under 35 U.S.C. 154(b) by 667 days.

(21) Appl. No.: 13/446,425

(22) Filed: Apr. 13, 2012

(65) Prior Publication Data

US 2013/0271782 A1 Oct. 17, 2013

(51) Int. Cl.
*H04N 1/00* (2006.01)
*H04N 1/333* (2006.01)

(52) U.S. Cl.
CPC ..... *H04N 1/33369* (2013.01); *H04N 1/33361* (2013.01)

(58) Field of Classification Search
None
See application file for complete search history.

(56) References Cited

U.S. PATENT DOCUMENTS

| | | | | |
|---|---|---|---|---|
| 4,058,672 A | * | 11/1977 | Crager | H04L 12/56 358/407 |
| 4,558,369 A | * | 12/1985 | Shinohara | H04N 1/324 358/407 |
| 7,787,377 B2 | * | 8/2010 | Hannu et al. | 370/235 |
| 7,899,038 B2 | * | 3/2011 | Ulybin | 370/353 |
| 8,542,600 B2 | * | 9/2013 | Kawabata | H04N 1/00214 358/1.15 |
| 2011/0080610 A1 | * | 4/2011 | Tanaka | H04N 1/00214 358/1.15 |
| 2012/0110403 A1 | * | 5/2012 | Chen | H04L 1/1809 714/748 |

OTHER PUBLICATIONS

Audio Codes, Mediant 600 & Mediant 1000 VoIP Media Gateways SIP Protocol Document # LTRT-83309, Nov. 2011, Version 6.4.*
3Com VCX V7111 VoIP SIP Gateways User Manual Part No. 900-0182-01 Rev AA, Jun. 2004, Version 4.2.*
T. Tsugawa, et al., TCP-AFEC: An Adaptive FEC Code Control for End-to-End Bandwidth Guarantee, IEEE Conference Publications, Packet Video 2007, pp. 294-301.

* cited by examiner

*Primary Examiner* — Darryl V Dottin
(74) *Attorney, Agent, or Firm* — BainwoodHuang

(57) ABSTRACT

Forward error correction is implemented in a facsimile transmission using adaptive redundancy. The depth of redundancy can change based on a number of factors, including lost packet counts, transport type, facsimile modulation type, call history or facsimile engine state changes. Separate redundancy depths can be implemented for image and for control phases of the facsimile call. Redundancy depth can be increased or decreased during a facsimile call, and may be maintained at an increased level once encountered transmission impediments are overcome. Variable redundancy can be provided for specific portions of the call, such as temporarily increased redundancy during control phases. Adaptive redundancy may be implemented at one or more endpoints or nodes in a packet-switched communication network through which the facsimile call passes. The adaptive redundancy contributes to improving successful facsimile call completion in communication networks that may be prone to error losses.

15 Claims, 3 Drawing Sheets

ADAPTIVE FACSIMILE REDUNDANCY

CROSS REFERENCE TO RELATED APPLICATION(S)

(Not Applicable)

STATEMENT REGARDING FEDERALLY SPONSORED RESEARCH OR DEVELOPMENT (Not Applicable)

BACKGROUND OF THE INVENTION

The present disclosure relates generally to facsimile transmission compensation, and more particularly to adaptive facsimile transmission redundancy that can compensate for problematic issues encountered in facsimile transmission.

Facsimile document transmission continues to have an important role in business communications for a number of reasons, including the ability to transfer images not stored on a local computer, legal acceptance of handwritten signatures, realtime confirmation of receipt, confidence in what has been sent/received, and the ability to provide a 'tamper resistant' copy of the information transferred. Since facsimile-enabled devices can be used with existing telecommunications networks, their popularity has increased to the point where such devices enjoy the advantage of being ubiquitous and familiar to users on a global scale. Such devices also may be shared by a number of individuals, such as in a workplace environment, reducing costs while still allowing for the sending and receiving of documents to be relatively efficient among a group of persons.

While facsimile communications have previously been implemented over circuit-switched networks, such as the public switched telephone network (PSTN), packet-switched networks, such as Internet Protocol (IP) networks, have been implemented to carry communications including facsimile communications. As these different types of networks continue to coexist, translation and communication between them has become (and should continue to be) an important part of communications, including facsimile communications.

Translation between circuit-switched and packet-switched communication networks typically involves the use of translation between different protocols, and is often performed by gateways, sometimes referred to as IP media gateways. A gateway can carry different types of communications between various network types, such as an IP network and a PSTN network. Such different types of communications may include voice or facsimile, for example. The gateway typically provides protocol translation service between the networks for these different types of communications. Facsimile transmissions typically adhere to the International Telecommunication Union Telecommunications Standardization Sector (ITU-T) Recommendation T.30, and are often implemented using the realtime facsimile transmission specification under the ITU-T Recommendation T.38.

IP networks are inherently asynchronous, tend to have greater latency and are relatively 'lossy' (lose or drop packets) as compared to PSTN networks, which typically operate on a time-division multiplexed (TDM) basis. While these characteristics of IP networks are known to adversely impact realtime communications, including both voice over IP (VoIP) and facsimile over IP (FoIP) communications, the impact to facsimile communications is typically more pronounced. Various solutions have been provided to address drawbacks related to realtime IP network communications, however, such solutions have tended to be focussed on voice data and the characteristics of voice-based calls. Facsimile users thus have sometimes reported negative experiences when attempting to perform facsimile transmissions over packet-switched networks.

Facsimile transmissions over packet-switched networks, including IP networks, typically use a facsimile transport protocol such as the T.38 realtime facsimile standard or the G.711 RTP (realtime transport protocol) facsimile pass-through codec, hereinafter referred to as the "G.711" codec. Often, the G.711 codec is used for facsimile pass-through when the T.38 protocol is unavailable at a given network node. The G.711 codec is suited for facsimile transmission in packet-switched network due to the low compression levels involved in implementing the codec. VoIP implementations typically support the G.711 codec as a default for pass-through facsimile transmissions.

In general, a VoIP network is optimized for handling voice traffic, where the particular characteristics of voice transmissions can be used to tailor components and/or operations in the VoIP network to improve the speed and reduce the bandwidth of voice communications. The system design and compensation provided for voice communications in an IP network tend to prove problematic for facsimile transmissions for a number of reasons. For example, the asynchronous nature of the IP network can create issues for those facsimile transmissions that are implemented in realtime. IP networks also tend to experience packet loss, which may not significantly degrade voice communications, but nevertheless can cause a facsimile transmission to degrade significantly or fail. Moreover, the asynchronous nature of packet-switched networks can result in variable latency or propagation delays, sometimes referred to as "jitter." The variable latency can be caused by different routes being taken through the network, as well as various conditions of network operation. Issues related to jitter are typically addressed with a jitter buffer that queues up packets of data at a network node to help alleviate the disjointedness of propagation delays and smooth the transmission of data packets. Jitter buffers tend to increase overall delay for transmissions through a packet-switched network, and are therefore usually designed to be relatively small in length/duration to avoid uncomfortably long pauses in voice communications, which may prompt both parties in a voice communication to attempt to speak at the same time. However, reduced size jitter buffers may lead to packet loss when propagation delays are significant in comparison to jitter buffer length and the reduced size jitter buffer may be unable to accommodate the propagation delay.

In view of the above difficulties encountered in implementing a packet-switched network that handles both realtime voice and facsimile transmissions, and with the bias for transmission tending toward providing compensation for voice communications, facsimile transmissions tend to be more significantly impacted by the above noted issues. For example, a voice transmission through an IP network may be able to tolerate 5% packet loss without significant degradation in voice quality in terms of a mean opinion score (MOS), which measures a human users view of the quality of a communication experience in a network. At the same time, a T.38 facsimile transmission tends to experience significant degradation with the same or less packet loss, while a G.711 transmission tends to experience significant degradation with packet losses less than those that might generally degrade a T.38 facsimile transmission.

With a communication network that has managed network access such as may include non-internet communications, most SIP trunk providers that manage such networks report a relatively low level of packet loss, for example, less than the above mentioned 5% packet loss. While this level of packet loss may be considered acceptable for the majority of voice communications, it still represents a significant degradation for facsimile transmission service, particularly for G.711 transmissions.

One conventional technique for addressing the above-noted issues for facsimile transmissions in a packet-switched network is to provide forward error correction. One form of forward error correction that can be readily implemented to correct for packet loss is to provide redundancy in T.38 or G.711 transmissions. The redundancy implementation for forward error correction is typically preferred over retransmission techniques, which tend to be less useful due to the timing constraints of realtime communications involving facsimile transmissions. With redundancy techniques to implement forward error correction, a transmitting node essentially duplicates a media payload in consecutive packets. One of the drawbacks in implementing redundancy is that a standard call, such as may be implemented with a G.711 transmission, consumes nearly twice the bandwidth of a call that is managed without redundancy. Another drawback of redundancy is the increased delay in communications, which sometimes can lead to degradation or failure of facsimile communications in conjunction with the propagation delay issues inherent in packet-switched networks. For example, delays accumulated over multiple network devices or components can cause facsimile failure if the round trip delay exceeds a T.30 facsimile transmission timeout value. Typically, due to the increased bandwidth requirements, service providers tend not to offer the option for enabling redundancy for facsimile transmissions, particularly for G.711 transmissions, due to the increased bandwidth usage and latency that occur regardless of whether the call is voice or facsimile, and regardless of network conditions.

It would be desirable to overcome the drawbacks related to facsimile transmissions in a communication network with relatively high latency. It would also be desirable to avoid facsimile transmission failure when using communication networks that experience packet loss without significantly increasing bandwidth usage.

SUMMARY

The present disclosure provides systems and methods for forward error correction tailored to T.38 and G.711 facsimile transmission by providing adaptive redundancy in facsimile transmissions over a packet-switched network. The level of redundancy, for example, the number of duplicate consecutive packets provided in a facsimile transmission, can vary on an adaptive basis. For example, the level of redundancy can be continually balanced or adjusted based on one or more parameters related to the facsimile transmission. The adaptive redundancy contributes to avoiding degradation in the facsimile transmission, while avoiding substantially increased average bandwidth.

According to an aspect of the present disclosure, the depth of redundancy can vary from zero, indicating no redundancy, to a maximum, which may provide several duplicate consecutive packets, during the facsimile transmission. The maximum number of redundant packets can be set for a given facsimile call based on one or more parameters related to characteristics of the facsimile transmission. The redundancy depth variability can be implemented to be responsive to configured settings, negotiated transmission characteristics, realtime parameters detected during the facsimile transmission, or the state, or phase, of the facsimile transmission.

According to another aspect of the present disclosure, the adaptive redundancy is implemented between two IP network endpoints involved in a facsimile transmission. The end-points or nodes through which the facsimile transmission occurs may implement the G.711 RTP facsimile pass-through codec or the T.38 protocol.

According to yet another aspect of the present disclosure, a facsimile transmission uses one or more categories of redundancy settings. For example, separate redundancy settings may be provided for image data and for control data. With separate redundancy settings for image data and for control data, different levels of redundancy may be employed for transmission of facsimile image data than might be used for transmission of facsimile control data. Facsimile call completion can sometimes be more sensitive to errors that impact the facsimile control phases of the facsimile transfer compared to errors that impact the transmission of image data. Accordingly, a different level of redundancy can be used for facsimile control phases than for facsimile image phases to permit greater flexibility in obtaining a successful facsimile transmission while attempting to minimize bandwidth usage. Separate redundancy settings may also be provided based on transport type, such as, for example, T.38 or G.711.

According to still another aspect of the present disclosure, redundancy levels can be modified during the facsimile transmission so that transmission errors can be dynamically compensated. For example, various parameter measurements taken during a facsimile transmission may be inspected to determine an increase or decrease in redundancy level for one or more phases of the facsimile transmission. As another example, a redundancy level may be increased to overcome transmission difficulties, and maintained at the chosen level for a remainder of the facsimile transmission.

According to a further aspect of the present disclosure, dynamic redundancy may be implemented at a single node or endpoint of a packet-switched network. For example, an endpoint device might not provide an option for redundancy in a facsimile transmission, however, redundancy enabled nodes or another endpoint device of the facsimile transmission in the packet-switched network can still utilize dynamic redundancy in accordance with the present disclosure to improve facsimile transmission quality of service.

According to a still further aspect, the present disclosure provides adaptive redundancy that may be based on factors such as: facsimile modulation type, e.g., V.17, V.34; T.30 state changes; a history of prior calls; a configured or negotiated transport type, for example, G.711 and/or T.38; reports from external network monitoring devices; reported lost packet counts; and/or detection of known end-points or gateway/relay equipment, for which redundancy might be adapted in accordance with a priori knowledge of the devices. According to a yet still further aspect, the present disclosure provides an adaptive depth of redundancy within a specified range. For example, the depth of redundancy may vary within a range from 0-9 consecutive duplicate packets.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Figure 1:
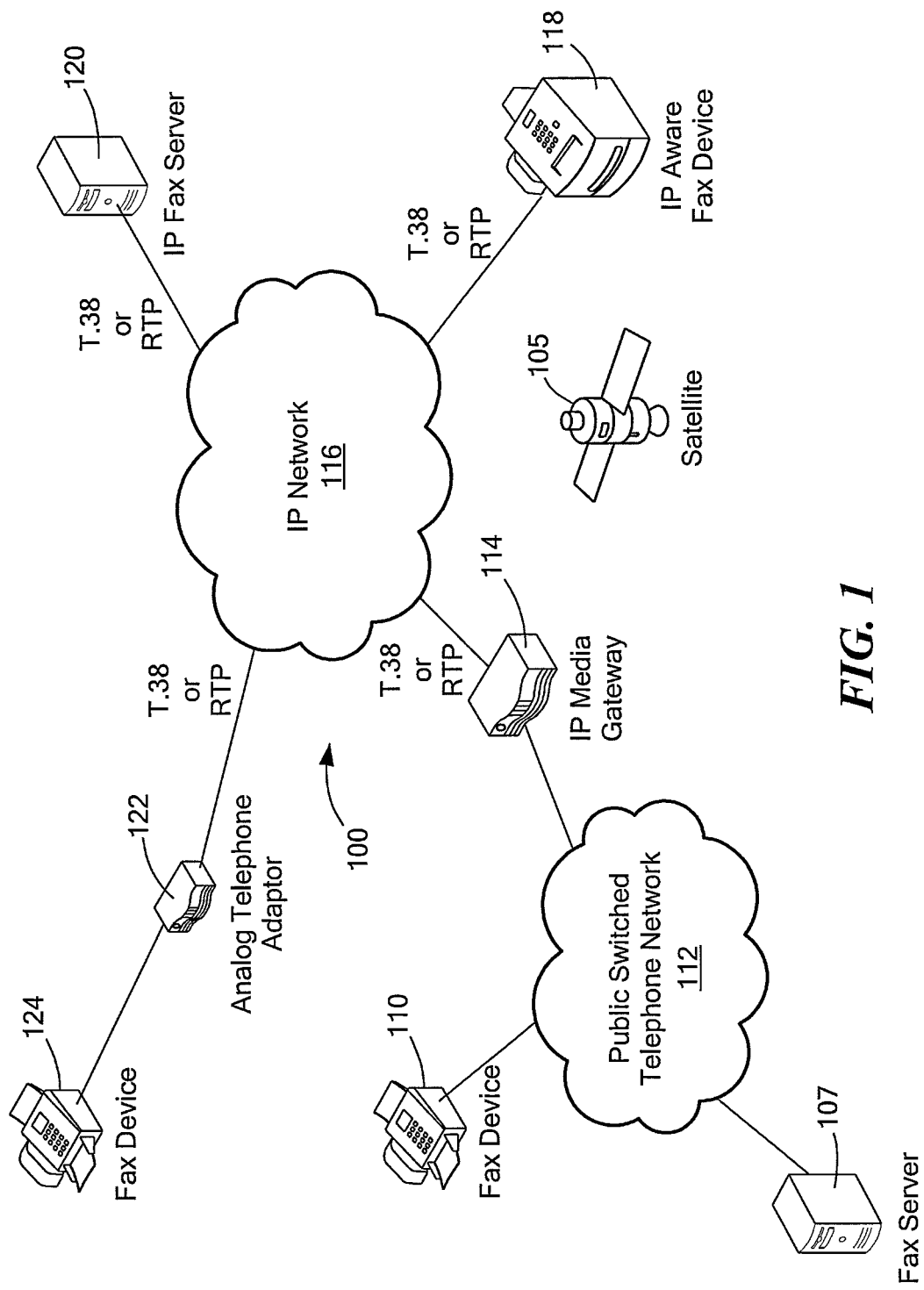
FIG. 1 is a diagram of network components in an exemplary communication network with circuit-switched and packet-switched components.

Referring to FIG. 1, an exemplary communication network 100 that permits facsimile transmission is illustrated. It is noted that the number, type, arrangement and/or capabilities, among other things, of some or all of the various devices shown in FIG. 1 may vary from that which is shown for various reasons (e.g., number of users of the network, location of the devices) and without undue experimentation.

In network 100, a facsimile server 107, a first facsimile device 110 or a second facsimile device 124 may originate or receive a facsimile transmission through analog signaling. For example, first facsimile device 110 may originate or receive a facsimile transmission that is sent over a/the Public Switched Telephone Network (PSTN) 112. Facsimile server 107 or first facsimile device 110 or second facsimile device 124 may operate using G3 (Group 3) type facsimile transmissions according to facsimile protocols such as the V.17, V.21, V.27 or V.29 facsimile protocols. Facsimile server 107 or facsimile devices 110 or second facsimile device 124 may operate using SG3 (Super Group 3) type facsimile transmissions according to the V.34 facsimile protocol. G3 and SG3 type facsimile communications conform to the International Telecommunication Union Telecommunications Standardization Sector (ITU-T) Recommendation T.30 (hereinafter "the T.30 specification") for facsimile transmission in the general switched telephone network, as may be implemented with network 100. PSTN 112 in network 100 may operate with communication protocols for a circuit-switched network, such as SS7, T1, E1 and other circuit-switched signaling and data communication protocols.

As shown in the exemplary embodiment in FIG. 1, PSTN 112 is connected to an intermediary device 114, which can be a gateway, such as an IP Media Gateway, which can perform translations between PSTN 112 and protocols used in an IP network 116. IP network 116 is illustrated as a cloud to represent an implementation of the present disclosure in a cloud-computing type environment. A cloud-computing type environment is formed with multiple interconnected computing resources, such as computer servers, to permit communication and computing services to be shared and distributed or centralized, depending on a chosen paradigm. According to an exemplary embodiment, IP network 116 is a packet-switched network that may implement the Internet Protocol (IP) routing and addressing methodology to transfer data packets. IP network 116 may implement various transport protocols, which may include UDP, TCP, RTP, T.38 and other media and data communication protocols for packet-switched networks. IP network 116 may be implemented to provide realtime facsimile transmission support with facsimile transmission protocols such as the T.38 protocol for realtime facsimile transmission or the G.711 codec. IP network 116 may include a number of network nodes (not shown) through which a facsimile transmission, originating at first facsimile device 110, for example, may travel. A facsimile transmission or communication may include one or more of facsimile setup or control commands, training data or image data, any or all of which may be referred to herein separately or collectively as a facsimile transmission. The devices connected to IP network 116, such as IP facsimile device 118, IP facsimile server 120, analog telephone adapter 122, which can also serve as an IP Media Gateway, and IP Media Gateway 114 may implement various codecs and/or protocols to provide a variety of communication transmissions. A satellite 105 is also illustrated in network 100, to indicate that some network pathways through PSTN 112 and/or IP network 116 may optionally be provided via a satellite link.

Figure 2:
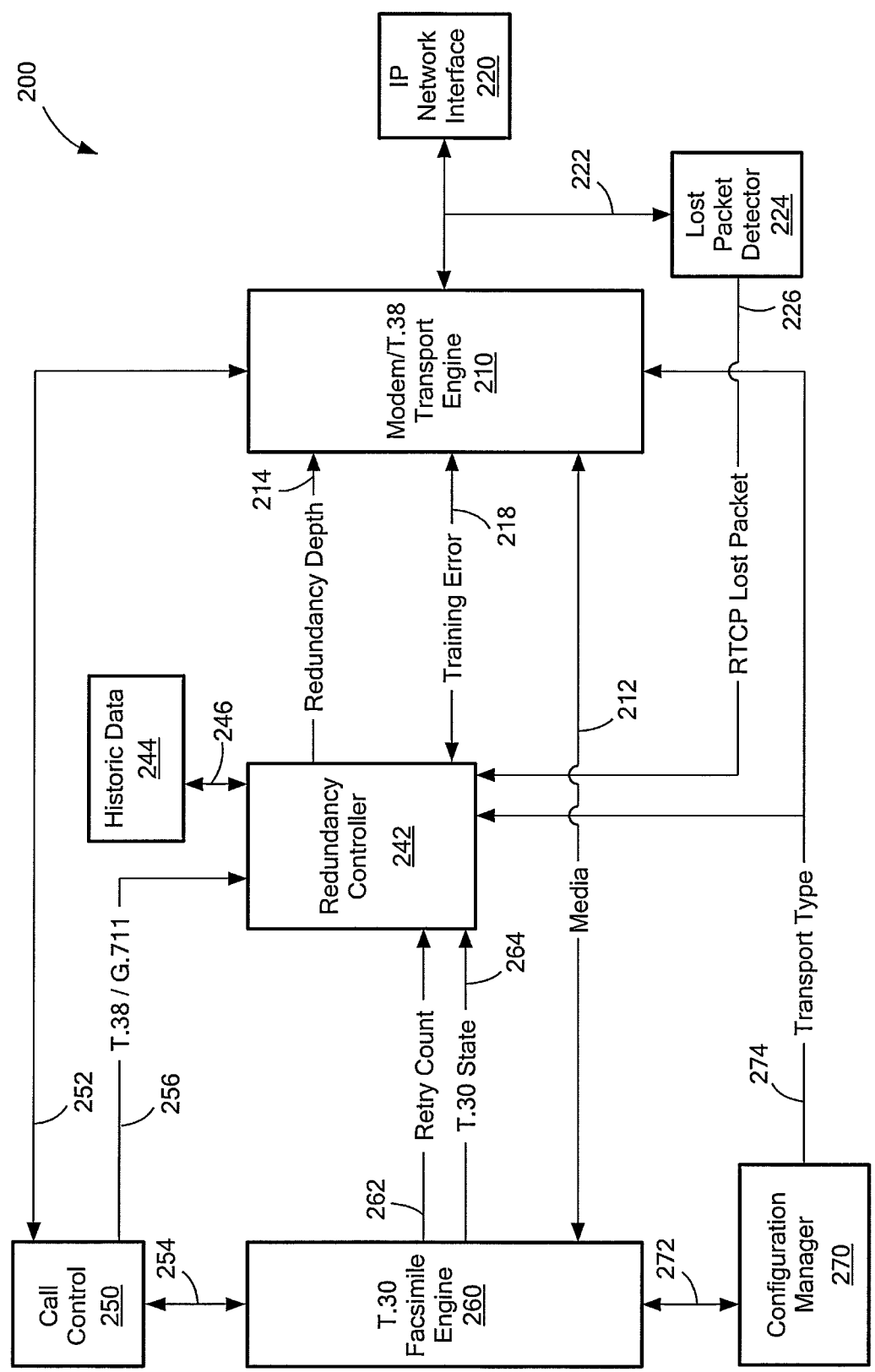
FIG. 2 is a block diagram of an exemplary facsimile endpoint of the exemplary communication network of FIG. 1.

Referring to FIG. 2, a block diagram of an exemplary facsimile endpoint 200 for sending and/or receiving facsimile transmissions in accordance with one or more exemplary embodiments of the disclosed systems and methods is illustrated. Facsimile endpoint 200 is illustrated as including an IP interface 220, which is a packet-switched interface. While FIG. 2 describes an exemplary embodiment of the present disclosure, it should be understood that the features and advantages of the present disclosure may be realized in implementations in one or more nodes of a packet-switched network, including implementations in an IP media gateway, as well as being implemented in components representing endpoints in a packet-switched network.

Facsimile endpoint 200 includes a transport engine 210 that can process modem transmissions and/or T.38 transmissions that involve IP interface 220. Transport engine 210 encodes or decodes the transmitted media, as indicated in a pathway 212. Transport engine 210 also provides an output 218 that indicates training errors that may occur during a facsimile transmission. Training errors can indicate an inability to synchronize facsimile endpoint devices to establish a facsimile transmission.

IP interface 220 provides an interface output signal 222 to a lost packet detector 224, which is able to detect lost packets on an IP network (not shown) connected to IP network interface 220. The detected lost packets may be encountered for facsimile transmissions that include outgoing facsimile calls (sending) and incoming facsimile calls (receiving). Lost packets can be detected by inspecting various parameters and their values, such as by monitoring a packet number sequence value to determine if there is a gap in the sequence, for example. Detector 224 provides realtime transport control protocol (RTCP) data on pathway 226 to a redundancy controller 242. The RTCP provides statistical and control information for RTP flow that can be used by redundancy controller 242 to control redundancy. The RTCP is generally used to provide feedback for quality of service in media distribution by periodically providing statistical information to participants in a streaming multimedia session.

Training error output 218 and RTCP data on pathway 226 are provided to redundancy controller 242 to contribute to determining how redundancy should be adapted in accordance with the present disclosure. Redundancy controller 242 also receives parameters from other sources, with examples of such parameters including but not being limited to historical data, call control data, configuration data and retry/command-response time data. In the case of historical data, a memory storage 244 stores historical data and communicates with redundancy controller 242 over a bidirectional link 246. The historical data stored in memory storage 244 may include items such as, by way of non-limiting example, overall delay issues associated with certain sources or destinations of facsimile transmissions, and may be used to modify redundancy depth in accordance with the present disclosure.

A call control unit 250 provides call control information to redundancy controller 242, based on (1) call control information provided to or received from transport engine 210 over call control signal pathway 252, and/or (2) call control information sent to or received from T.30 facsimile engine 260 over a signal pathway 254. Call control information provided by call control unit 250 is delivered to redundancy controller 242 over signal pathway 256 and may include information specific to the protocol or codec used during the facsimile call, including such protocols and/or codecs as T.38 and/or G.711.

T.30 facsimile engine 260 also provides signals to redundancy controller 242, which so provided signals are illustrated as a retry count signal 262 and a T.30 state signal 264. T.30 facsimile engine 260 uses inputs received on media pathway 212, call control signal pathway 254 and a configuration manager input on signal pathway 272 to derive and output signals 262 and 264 based on the T.30 specification. Thus, T.30 facsimile engine 260 provides the mechanism for implementing the T.30 specification for facsimile transmission and reception.

Redundancy controller 242 also receives input from configuration manager 270 over pathway 274, which provides information regarding media transport type. For example, configuration manager 270 can provide information specific to the G.711 or the T.38 transport types. The configuration information from configuration manager 270 is provided on pathway 274 to transport engine 210 to configure the type of transport and/or to configure transport settings for the facsimile transmission. In addition, the configuration information from configuration manager 270 is communicated to redundancy controller 242 over signal pathway 274 to permit redundancy depth calculations to be carried out based on transport type.

Redundancy controller 242 receives inputs from various sources that can contribute to calculating redundancy depth. In accordance with the present disclosure, redundancy controller 242 can modify the redundancy depth value. The parameters used to modify redundancy depth can include, by way of non-limiting examples: a history of prior calls and/or detected additional call management entities, such as SIP registrars, gate keepers and/or proxies. Call management entities can be detected based on call control messages received from call control unit 250 on signal pathway 256. It is possible to use detector 224 to provide information related to call management entities through use of the RTCP protocol, which information can be provided to redundancy controller 242 over signal pathway 226.

Redundancy controller 242 may also modify redundancy depth based on facsimile transmission related parameters. Those parameters may include, by way of non-limiting examples: the configured media stream, such as G.711, T.38; negotiated settings, such as G.711 or T.38 or secure facsimile; RTCP reported lost packet counts, including burst metrics during initial call discrimination or when using G.711 during facsimile transmissions; history of prior calls, including identification of specific endpoints or specific telephone numbers to which a facsimile call is directed; time of day; and detection of known gateway/relay equipment, for which redundancy may be adapted in known ways based on the detected equipment; external network monitoring device reports, such as those that might be generated with methods other than RTCP for reporting packet loss; facsimile modulation type, such as V.17, V.34 and other modulation types; T.30 state changes, including ECM usage; duplex usage with silence, such as when receiving a facsimile in V.17 mode; modem train-downs, e.g., failure to train (FTT) or RTP errors; command retries after timer expiry and responses to push-profile-request (PPR) commands.

Redundancy controller 242 may thus modify redundancy depth time of day in accordance with the T.30 specification and produce adapted redundancy depth values that are provided to transport engine 210 over a signal pathway 214. The redundancy depth is used by transport engine 210 during facsimile transmission operations to set a number of duplicate consecutive packets that are sent by facsimile endpoint 280 via IP interface 220. Redundancy values may be set for outgoing packets during facsimile transmission or reception, for different transport types, e.g., T.30 or G.711 and for control or image phases, for example. Redundancy controller 242 thus performs calculations to determine redundancy depth and modifies and/or stores one or more redundancy depth values that can be provided to transport engine 210 for use in facsimile transmissions. Alternately, or in addition, transport engine 210 may store redundancy depth values.

Figure 3:
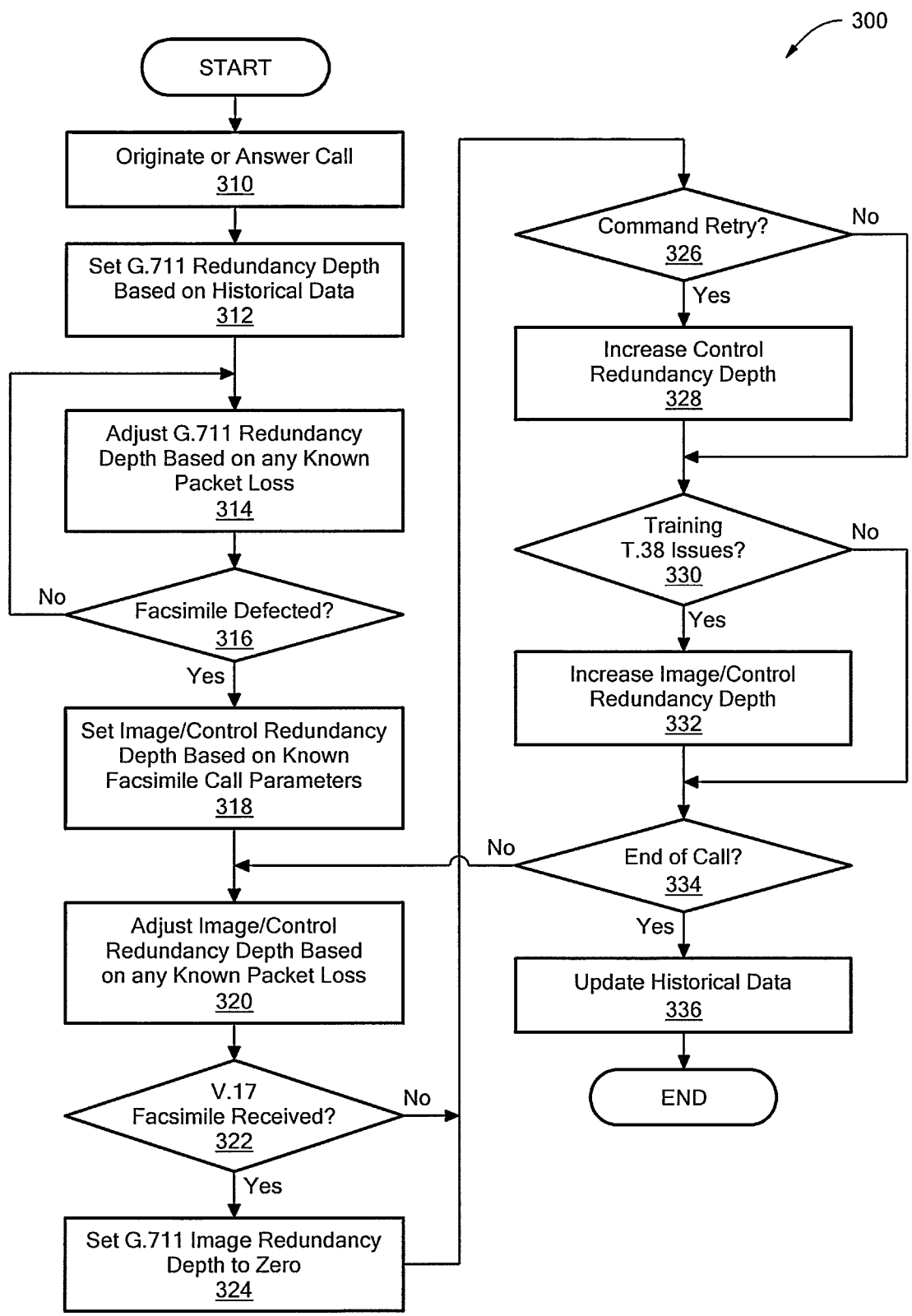
FIG. 3 is a flowchart illustrating an exemplary redundancy adaptation process.

Referring now to FIG. 3, an exemplary embodiment of a process flow according to the disclosed systems and methods is illustrated with flowchart 300. The process illustrated in flowchart 300 begins when a facsimile call is originated or answered, as indicated in block 310. At the outset of the facsimile call, it is treated as a regular G.711 voice call until a determination is made that the call is a facsimile transmission. While the call is treated as a G.711 voice call, redundancy depth is initialized based on historical data, for example, as indicated in block 312. The historical data may represent information such as known facsimile destinations that have a history in terms of packet loss. The historical data may also provide error rates from prior calls that may have occurred within a certain timeframe, such as within a previous number of hours or days, as well as histographic data that may include statistics for error rates for different times of day. Some or all of this historical data may be used to set an initial redundancy depth for the G.711 call.

The initial redundancy depth may include a number of different redundancy levels, which may be separately stored and maintained. For example, separate levels may be stored and maintained for different transport types such as G.711 or T.38 transport types for use in adaptive redundancy transmissions. The initial redundancy depth may also be set for separate control and/or image redundancy levels. As the call progresses, other techniques can be employed to set or update redundancy depth(s). For example, RTCP reports can be used to aid initial call discrimination for detection of facsimile tones while determining the quality of service for the call. Thus, the initial redundancy depth setting for the call being treated as a G.711 voice call can be adjusted based on known packet loss criteria, as indicated in block 314. Packet loss may be detected or reported, and may cause the G.711 redundancy depth to be -13-increased or decreased, or remain the same. For example, if RTCP reports indicate no packet losses, the G.711 redundancy depth can be reduced by one (1) or, if the depth is zero (0), the redundancy depth may stay the same. If RTCP reports do indicate packet losses, the G.711 redundancy depth can be adjusted to be increased by one (1) level of redundancy, for example.

After setting an initial redundancy depth for the call, the process illustrated in flowchart 300 determines if a facsimile call is detected, as indicated in decision block 316. If no facsimile transmission is detected, process 300 can continue to adjust the G.711 redundancy depth based on known packet losses, as indicated with the "No" branch of decision block 316 returning to re-enter block 314. If a facsimile transmission is detected, the type of transport is known, such as, for example, T.38 or G.711, and image and/or control redundancy depths can be set based on the transport type and other known facsimile call parameters, as indicated in block 318 being reached via the "Yes" branch of decision block 316. For example, if the G.711 facsimile transport is detected, redundancy depths may be set to zero (0) for both image and control redundancy portions based on the initial redundancy depth settings established previously, as illustrated in blocks 312 and 314. If the T.38 facsimile transport is detected, the redundancy depth can be set to match the redundancy depth initialized with historical data for image redundancy, and can be set to a greater redundancy depth for control redundancy. For example, when the T.38 facsimile transport is detected, default values of one (1) for image redundancy depth and two (2) for control redundancy depth can be set. The increased redundancy depth for T.38 facsimile transport can be set with more flexibility than G.711 transport, because the T.38 transport bandwidth tends to be less than that of G.711 transport, so that increased levels of redundancy have a lesser impact on the use of bandwidth in T.38 transmissions.

Once the redundancy depth is set for both image and control redundancy portions of the facsimile transmission, an additional adjustment for those portions can be made based on any known packet losses, as is indicated in block 320. The known packet losses can be detected or reported packet losses, and may also be used to adjust the initial G.711 redundancy depth, as indicated in block 314. For example, as the call proceeds initially, and is determined to be a facsimile call, known packet losses, if any, can be determined during call setup and other initial phases before facsimile operations begin.

Once the redundancy depth is set for the image and control portions of the facsimile transmission, a determination is made in the case of a G.711 transport facsimile call whether a V.17 protocol facsimile transmission is being received, as indicated in decision block 322. This determination for V.17 facsimile reception is made on the basis that the receiving device provides a return stream of silence, for which redundancy need not be employed. If the facsimile transmission is not a V.17 facsimile reception, process 300 continues with established facsimile operations, as indicated with the "No" branch being taken out of decision block 322. If the facsimile transmission is a V.17 facsimile reception, the image redundancy depth for the G.711 transport is set to zero (0) to recognize that the return stream is silence when receiving a V.17 facsimile transmission, as indicated in block 324.

During the facsimile transmission, commands are provided for managing the facsimile call, with attendant T.30 timers that are used to determine whether a command retry should be initiated. For example, a T.30 command may be provided in the facsimile transmission, and a T.30 timer, such as the T.30 specification timer T4, is started to provide a measure of response time to the command. If the T.30 timer expires, indicating that the acknowledgement for the command has not been received within the time period specified by the T.30 timer, a command retry may take place. Expiration of the T.30 timer typically indicates that there were significant propagation delays, packet losses or errors in the transmission, which might be overcome with an increase in redundancy depth for the control redundancy. The process illustrated in flowchart 300 makes a determination of whether a command retry occurs, such as may be called for when a T.30 timer has expired, in decision block 326. If a command retry takes place, as indicated by the "Yes" branch out of decision block 326, the control redundancy depth is increased, typically by one level, as indicated in block 328. If there was no command retry, typically indicating that the T.30 timer did not expire, then control redundancy depth is maintained at a same level, as indicated by the "No" branch out of decision block 326 routed around block 328.

Facsimile error correction mode (ECM) can be used to detect and retransmit image sections of the facsimile transmission, using control phases. Because the control phases are more sensitive to errors in transmission, the control redundancy depth of G.711 or T.38 facsimile calls can also be adjusted based on whether ECM is in use, and whether partial page signals (PPS) or partial page requests (PPR) are detected when ECM is in use. For example, if a network node or endpoint implementing the T.38 facsimile transport is receiving a facsimile transmission, and detects PPRs while employing ECM, control redundancy depth may be increased by one level, while a similar one level increase may be made to the image redundancy depth.

Another issue regarding facsimile transmissions under the T.30 specification is whether the transmission devices train down to a lower speed in the face of line impairments. If a T.30 state machine or modem, such as may be implemented in T.30 facsimile engine 260 (FIG. 2) indicates training failures, both image and control redundancy depths may be increased. The detection or indication of training failures or other protocol issues within the T.30 specification is illustrated in decision block 330. If training or T.30 issues are detected, the image and/or control redundancy depths may be increased to overcome the transmission issues, as indicated in block 332 that is reached via the "Yes" branch of decision block 330. If there are no training or other T.30 issues observed in the facsimile transmission, the image and/or control redundancy depths need not be adjusted, which determination is indicated with the "No" branch of decision block 330 routed around block 332.

The facsimile transmission adaptive redundancy continues processing until the end of the facsimile call, as is indicated in decision block 334. If the end of the facsimile call is not reached, process 300 continues with an adjustment to the image and/or control redundancy depths based on packet losses, as is indicated with the "No" branch of decision block 334 being routed to block 320 to permit continued processing for the adaptive redundancy of the facsimile call. If the end of the call is reached, as indicated with the "Yes" branch of decision block 334, historical data for use with redundancy depth processing can be updated, as indicated with block 336. With the update of historical data for redundancy depth processing, information regarding a particular called or calling party can be tracked, in addition to timely notation of transmission errors, e.g., a level of transmission errors within the last three hours.

The process illustrated in flowchart 300 can be used to set redundancy depth levels for G.711 and T.38 transmissions, for both control and image portions of the facsimile transmissions. Image and control redundancy depths can be independently adjusted, such as in the case of a command retry causing an increase in the control redundancy depth, without modifying the image redundancy depth, for example. Image and control redundancy depths can also be adjusted in unison, where transmission impairments are determined during the facsimile call that employs the G.711 or T.38 transport type. Adjustments to the image and/or control redundancy depths may also be made depending upon whether the facsimile transmission is being sent or received, such as in the case where a V.17 facsimile call is being received at a node and is expected to transmit silence from the node with the redundancy being set to zero (0), as discussed in the example above.

In addition, while UDP (user datagram protocol) or TCP (transmission control protocol) may be used in a packet-switched network for transmission control, TCP provides correction for packet losses in accordance with the definition of the protocol. Accordingly, when adaptive redundancy in accordance with the present disclosure is used for T.38 over TCP, additional advantages in quality of service may be achieved, particularly if T.38 forward error correction (FEC) is available for the transmission endpoints.

According to one or more embodiments of the present disclosure, redundancy depth for a facsimile call using the G.711 or T.38 transport type, being sent or received, may be reduced during the call for either control or image redundancy depth. For example, if there is no reported or detected packet loss after some level of packet loss has been detected, control and/or image redundancy depths may be decreased. Similarly, if command retries are reduced or eliminated during a facsimile call, or other training or T.30 issues become resolved during the facsimile call, control and/or image redundancy depths may be decreased.

In accordance with another exemplary embodiment of the present disclosure, redundancy depth may be maintained at given levels when transmission impediments during a facsimile call are overcome as redundancy depth increases. If bandwidth is a critical factor in providing facsimile transmission support, the facility of reducing redundancy depth can help to conserve bandwidth. In addition, redundancy depth increases in response to command retry events can be made to be temporary until the particular command/response control phase is completed. Redundancy depths can then be returned to a lower, nominal value after the completion of such phases to assist in obtaining reduced overall bandwidth for the facsimile call.

While not all facsimile endpoints may support redundancy, the approach and advantages described in the present disclosure can still apply when one endpoint supports redundancy. The duplication of consecutive packets in a given transmission can be accomplished without significantly impacting the performance of an endpoint that does not support redundancy, so that improvements and advantages in accordance with the present disclosure may still be obtained. In particular, facsimile transmission success may be improved when the sending endpoint employs adaptive redundancy in accordance with the present disclosure, since the bulk of the packets in a facsimile transmission are from the sender.

The implementation of adaptive redundancy in accordance with the present disclosure may obtain particular advantages in a communication network that implements packet-switched segments, as well as circuit-switched segments. For example, the implementation of training down to a lower speed with a T.30 facsimile transmission in the face of line impairments was typically employed originally for PSTN networks. Line impairment on a packet-switched network, such as an IP network, is typically more likely the result of packet loss rather than noise or reduced bandwidth. Accordingly, for a typical facsimile call placed over a packet-switched network that may include TDM segments, increased redundancy in conjunction with training down may help to improve facsimile call success probabilities. In the case of a facsimile call placed over a packet-switched network, for example, with internet aware facsimile endpoints, an effective strategy may be implemented to use redundancy rather than implementing training down in accordance with the T.30 specification. It should be noted that the present disclosure may be implemented by gateways that translate between packet-switched networks and circuit-switched networks. In addition, the present disclosure attains advantages for facsimile call success if only one endpoint implements adaptive redundancy, while another endpoint employs none or static redundancy. It is further noted that the present disclosure may be used in support of UDP or TCP based transmissions.

The operations herein depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A facsimile device for processing a facsimile call, comprising:
    a memory storage for storing at least one redundancy depth value for transmission of facsimile data, the facsimile data including facsimile image data and facsimile control data;

a redundancy controller communicatively coupled to the memory storage and being operable to calculate at least one variable number of duplicate consecutive packets to be sent by the facsimile device while processing the facsimile call based at least in part on at least one input related to operation of the facsimile device, wherein each of the at least one variable number of duplicate consecutive packets contain duplicate payloads of at least some of one of the facsimile image data and the facsimile control data, and wherein the redundancy controller is further operable to set the at least one redundancy depth value to the calculated at least one variable number of duplicate consecutive packets, and to store the at least one redundancy depth value in the memory storage; and a processor communicatively coupled to the memory storage and being operable to access and apply the at least one redundancy depth value in processing the facsimile call in order to provide the calculated at least one variable number of duplicate consecutive packets in a facsimile transmission, wherein the at least one redundancy depth value comprises an image redundancy depth value for transmission of the facsimile image data, and a control redundancy depth value for transmission of the facsimile control data, and wherein the redundancy controller is further operable to modulate the control redundancy depth value in accordance with operations during a control phase of the facsimile call, the modulated control redundancy depth value being different from the image redundancy depth value.

2. The device according to claim 1, wherein a previous redundancy depth value that is stored in the memory storage is used to calculate the at least one variable number of duplicate consecutive packets.

3. The device according to claim 2, wherein the redundancy controller is operable to increase or decrease the previous redundancy depth value to calculate the at least one variable number of duplicate consecutive packets.

4. The device according to claim 3, wherein the redundancy controller is operable to increase the previous redundancy depth value to calculate the at least one variable number of duplicate consecutive packets, and the processor is operable to provide a command retry with the so calculated at least one variable number of duplicate consecutive packets.

5. The device according to claim 1, further comprising:
a second controller communicatively coupled to the redundancy controller and being operable to provide a parameter value related to facsimile call processing to the redundancy controller as an input to which the redundancy controller is responsive.

6. The device according to claim 5, wherein the second controller includes one or more of a call control unit, a storage device for storing historical facsimile call data, a lost packet detector, a transport engine, a configuration manager, an external network monitoring device or a facsimile engine.

7. The device according to claim 5, wherein the parameter value is related to one or more of a prior call history, configured or negotiated transport type, lost packet counts, facsimile modulation type or a facsimile engine state change.

8. The device according to claim 7, wherein the facsimile engine state change comprises one or more of a change between image and control phases, modem train-down, command retry, transmitting silence or managing error correction mode commands.

9. A method of processing a facsimile call by a facsimile device, the facsimile device including a controller and a processor, the method comprising:

obtaining at least one redundancy depth value for transmission of facsimile data, the facsimile data including facsimile image data and facsimile control data;

calculating, by the controller, at least one variable number of duplicate consecutive packets to be sent by the facsimile device while processing the facsimile call based at least in part on at least one input related to operation of the facsimile device, each of the at least one variable number of duplicate consecutive packets containing duplicate payloads of at least some of one of the facsimile image data and the facsimile control data;

setting, by the controller, the at least one redundancy depth value to the calculated at least one variable number of duplicate consecutive packets;

applying, by the processor, the at least one redundancy depth value in processing the facsimile call in order to provide the calculated at least one variable number of duplicate consecutive packets in a facsimile transmission, the at least one redundancy depth value comprising an image redundancy depth value for transmission of the facsimile image data, and a control redundancy depth value for transmission of the facsimile control data; and modulating, by the controller, the control redundancy depth value in accordance with operations during a control phase of the facsimile call, the modulated control redundancy depth value being different from the image redundancy depth value.

10. The method according to claim 9, wherein the calculating of the at least one variable number of duplicate consecutive packets includes calculating the at least one variable number of duplicate consecutive packets using a previous redundancy depth value.

11. The method according to claim 10, wherein the calculating of the at least one variable number of duplicate consecutive packets includes increasing or decreasing the previous redundancy depth value.

12. The method according to claim 9, wherein the facsimile device further includes a second controller, wherein the method further comprises:

providing, by the second controller, a parameter value related to facsimile call processing to the controller as an input to which the controller is responsive, and wherein the calculating of the at least one variable number of duplicate consecutive packets includes calculating the at least one variable number of duplicate consecutive packets based at least in part on the parameter value related to the facsimile call processing.

13. The method according to claim 12, wherein the parameter value is related to one or more of a prior call history, a configured or negotiated transport type, lost packet counts, a facsimile modulation type, and a facsimile engine state change.

14. The method according to claim 13, wherein the facsimile engine state change comprises one or more of a change between image and control phases, a modem train-down, a command retry, transmitting silence, and managing error correction mode commands.

15. The method according to claim 11, wherein the calculating of the at least one variable number of duplicate consecutive packets includes increasing the previous redundancy depth value, and wherein the method further comprises:
   providing, by the processor, a command retry with the calculated at least one variable number of duplicate consecutive packets.

* * * * *